US006982071B2

(12) United States Patent
Ma et al.

(10) Patent No.: US 6,982,071 B2
(45) Date of Patent: Jan. 3, 2006

(54) THIN-FILM MAGNETIC RECORDING MEDIA WITH DUAL INTERMEDIATE LAYER STRUCTURE FOR INCREASED COERCIVITY

(75) Inventors: Xiaoding Ma, Redwood City, CA (US); Kevin J. Grannen, Fremont, CA (US); Jing Gui, Fremont, CA (US); Jeffrey A. McCann, Tracy, CA (US); Mark A. Shows, Fremont, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 24 days.

(21) Appl. No.: 10/756,466

(22) Filed: Jan. 14, 2004

(65) Prior Publication Data

US 2004/0146685 A1 Jul. 29, 2004

Related U.S. Application Data

(62) Division of application No. 09/982,937, filed on Oct. 22, 2001, now Pat. No. 6,689,425, which is a division of application No. 09/400,187, filed on Sep. 21, 1999, now Pat. No. 6,312,798.

(60) Provisional application No. 60/101,843, filed on Sep. 25, 1998.

(51) Int. Cl.
*C01B 31/06* (2006.01)
*C23C 14/48* (2006.01)
*C23C 14/24* (2006.01)
*H05H 1/46* (2006.01)

(52) U.S. Cl. .................. 423/445 R; 423/446; 427/131; 427/523; 427/562; 427/577

(58) Field of Classification Search ............... 427/131, 427/523, 524, 525, 528, 530, 562, 577; 423/445 R, 423/446
See application file for complete search history.

(56) References Cited

U.S. PATENT DOCUMENTS

| | | | |
|---|---|---|---|
| 4,919,779 A | | 4/1990 | Mizoguchi et al. |
| 5,117,299 A | * | 5/1992 | Kondo et al. ................ 349/52 |
| 5,185,067 A | | 2/1993 | Shibahara et al. |
| 5,391,409 A | | 2/1995 | Shibata et al. |
| 5,455,081 A | | 10/1995 | Okada et al. |
| 5,508,368 A | | 4/1996 | Knapp et al. |
| 5,547,714 A | | 8/1996 | Huck et al. |
| 5,616,179 A | | 4/1997 | Baldwin et al. |
| 5,618,389 A | | 4/1997 | Kreider |
| 5,650,201 A | | 7/1997 | Tompa |
| 5,785,825 A | | 7/1998 | Hwang et al. |
| 5,830,331 A | | 11/1998 | Kim et al. |
| 5,837,357 A | | 11/1998 | Matsuo et al. |
| 5,858,477 A | | 1/1999 | Veerasamy et al. |
| 6,077,569 A | | 6/2000 | Knapp et al. |
| 6,086,949 A | | 7/2000 | Hwang et al. |
| RE37,294 E | | 7/2001 | Knapp et al. |
| 6,392,244 B1 | | 5/2002 | Grannen et al. |
| 6,565,719 B1 | | 5/2003 | Lairson et al. |
| 6,572,935 B1 | | 6/2003 | He et al. |
| 6,613,422 B1 | | 9/2003 | Ma et al. |
| 6,793,849 B1 | * | 9/2004 | Gruen et al. ................ 252/502 |

* cited by examiner

*Primary Examiner*—Marianne Padgett
(74) *Attorney, Agent, or Firm*—McDermott Will & Emery LLP

(57) ABSTRACT

Ion beam-deposited, nitrogen-doped C:H films having substantially lower resistivities than undoped ion beam-deposited C:H films and suitable for use as hard, abrasion-resistant overcoat layers for magnetic recording media, such as hard disks, are formed by supplying a mixture of hydrocarbon and nitrogen gases to an ion beam generator. Nitrogen atom content of the films is controlled to within from about 5 to about 25 at. % by appropriate selection of the ratio of hydrocarbon gas flow to nitrogen gas flow. The resultant IBD i-C:HN films exhibit a reduced tendency for charge build-up thereon during hard disk operation by virtue of their lower resistivity vis-à-vis conventional a-C:H materials.

2 Claims, No Drawings

# THIN-FILM MAGNETIC RECORDING MEDIA WITH DUAL INTERMEDIATE LAYER STRUCTURE FOR INCREASED COERCIVITY

CROSS-REFERENCE TO PROVISIONAL APPLICATION

This application is a divisional of application Ser. No. 09/982,937 filed Oct. 22, 2001, now U.S. Pat. No. 6,689,425, which is a divisional of application Ser. No. 09/400,187 filed Sep. 21, 1999, now U.S. Pat. No. 6,312,798.

This application claims priority from provisional patent application Ser. No. 60/101,843, filed Sep. 25, 1998, the entire disclosure of which is incorporated herein by reference.

FIELD OF THE INVENTION

The present invention relates to a novel, nitrogen-doped, abrasion-resistant material useful as a protective overcoat layer for a magnetic recording medium, e.g., a hard disk, a method of manufacturing said material, and a method of controlling the amount of nitrogen doping of the material.

BACKGROUND OF THE INVENTION

A magnetic recording medium, e.g., a hard disk, typically comprises a laminate of several layers, comprising a non-magnetic substrate, such as of Al—Mg alloy or a glass or glass-ceramic composite material, and formed sequentially on each side thereof, a polycrystalline underlayer, typically of chromium (Cr) or Cr-based alloy, a polycrystalline magnetic recording medium layer, e.g., of a cobalt (Co)-based alloy, a hard, abrasion-resistant, protective overcoat layer, typically containing carbon, and a lubricant topcoat.

In operation of the magnetic recording medium, the polycrystalline magnetic recording medium layer is locally magnetized by a write transducer, or write head, to record and store information. The write transducer creates a highly concentrated magnetic field which alternates direction based on the bits of information being stored. When the local magnetic field produced by the write transducer is greater than the coercivity of the recording medium layer, then the grains of the polycrystalline recording medium at that location are magnetized. The grains retain their magnetization after the magnetic field produced by the write transducer is removed. The direction of the magnetization matches the direction of the applied magnetic field. The magnetization of the polycrystalline recording medium can subsequently produce an electrical response in a read transducer, allowing the stored information to be read.

Thin film magnetic recording media are conventionally employed in disk form for use with disk drives for storing large amounts of data in magnetizable form. Typically, one or more disks are rotated on a central axis in combination with data transducer heads. In operation, a typical contact start/stop (CSS) method commences when the head begins to slide against the surface of the disk as the disk begins to rotate. Upon reaching a predetermined high rotational speed, the head floats in air at a predetermined distance from the surface of the disk due to dynamic pressure effects caused by air flow generated between the sliding surface of the head and the disk. During reading and recording operations, the transducer head is maintained at a controlled distance from the recording surface, supported on a bearing of air as the disk rotates. such that the head can be freely moved in both the circumferential and radial directions, allowing data to be recorded on and retrieved from the disk at a desired position. Upon terminating operation of the disk drive, the rotational speed of the disk decreases and the head again begins to slide agains the surface of the disk and eventually stops in contact with and pressing against the disk. Thus, the transducer head contacts the recording surface whenever the disk is stationary, accelerated from the static position, and during deceleration just prior to completely stopping. Each time the head and disk assembly is driven, the sliding surface of the head repeats the cyclic sequence consisting of stopping, sliding against the surface of the disk, floating in the air, sliding against the surface of the disk, and stopping.

As a consequence of the above-described cyclic CSS-type operation, the surface of the disk or medium surface wears off due to the sliding contact if it has insufficient abrasion resistance or lubrication quality, resulting in breakage or damage if the medium surface wears off to a great extent, whereby operation of the disk drive for performing reading and reproducing operations becomes impossible. The protective overcoat layer is formed on the surface of the polycrystalline magnetic recording medium layer so as to protect the latter from friction and like effects due to the above-described sliding action of the magnetic head. Abrasion-resistant, carbon (C)-containing protective coatings have been utilized for this purpose, and are typically formed by sputtering of a carbon target in an argon (Ar) atmosphere. Such amorphous carbon (a-C)-containing protective overcoat layers formed by sputtering have relatively strong graphitic-type bonding, and therefore exhibit a low coefficient of friction in atmospheres containing water ($H_2O$) vapor, which characteristic is peculiar to graphite. However, the a-C layers produced in such manner have very low hardness as compared with many ceramic materials such as are employed as slider materials of thin film heads, and thus are likely to suffer from wear due to contact therewith.

In recent years, therefore, carbon-based protective overcoat layers having diamond-like hardness properties (i.e., HV of about 1,000–5,000 $kg/mm^2$) have been developed, and films of diamond-like carbon (DLC) having a high percentage of diamond-type C—C bonding have been utilized. Such DLC films exhibit a high degree of hardness due to their diamond-like $sp^3$ bonding structure, and in addition, exhibit the excellent sliding properties characteristic of carbon, thus affording improved sliding resistance against sliders composed of high hardness materials. Such DLC films are generally obtained by DC or RF magnetron sputtering of a carbon target in a gas atmosphere comprising a mixture of Ar gas and a hydrocarbon gas, e.g., methane, or hydrogen gas. The thus-obtained films exhibit DLC properties when a fixed amount of hydrogen is incorporated therein. Incorporation of excessive amounts of hydrogen in the films leads to gradual softening, and thus the hydrogen content of the films must be carefully regulated.

Amorphous, hydrogenated carbon films (referred to herein as a-C:H films) obtained by sputtering of carbon targets in an $Ar+H_2$ gas mixture exhibiting diamond-like properties have also been developed for improving the tribological performance of disk drives; however, the electrical insulating properties of such type films lead to undesirable electrical charge build-up or accumulation during hard disk operation which can result in contamination, glide noise, etc. In order to solve this problem without sacrifice or diminution of the advantageous mechanical properties of such a-C:H films, attempts have been made to dope or otherwise incorporate nitrogen (N) atoms into the a-C:H films, in view of a substantial decrease in electrical resistivity and optical band gap ($E_{BG}$) exhibited by such nitrogen-doped a-C:H films relative to undoped films.

However, the continuous increase in areal recording density of magnetic recording media requires a commensurately lower flying height. Therefore, it would be advantageous to reduce the thickness of the carbon-based protective overcoat layer to below about 100 Å without adverse consequences. Conventional sputtered a-C:H materials are difficult to uniformly deposit and generally do not function satisfactorily at a thickness of about 100 Å or less. The use of alternative deposition techniques for developing thinner and harder a-C:H layers having the requisite mechanical and tribological properties has been studied, such as chemical vapor deposition (CVD), ion beam deposition (IBD), and cathodic arc deposition (CAD) techniques. For example, the IBD method can be utilized for forming hydrogenated ion-beam carbon films (referred to herein as i-C:H films) that exhibit superior tribological performance at thicknesses below about 100 Å. However, such films are insulating and, thus, suffer from the above-described drawback of electrical charge build-up during hard disk operation associated with sputtered a-C:H films.

Accordingly, there exists a need for an improved hard, abrasion-resistant material particularly suitable for use as a protective overcoat layer in high-density magnetic recording media, and a method for manufacturing same, which method is simple, cost-effective and fully compatible with the productivity and throughput requirements of automated manufacturing technology.

The present invention fully addresses and solves the above-described problems attendant upon the manufacture of ultra-thin, abrasion-resistant protective overcoat layers suitable for use with high density magnetic recording media, such as are employed in hard drive applications, while maintaining full compatibility with all mechanical and electrical aspects of conventional disk drive technology.

DISCLOSURE OF THE INVENTION

An advantage of the present invention is an improved hard, abrasion-resistant, ion beam-deposited (IBD) material.

Another advantage of the present invention is an improved protective overcoat material for magnetic recording media and comprising IBD, nitrogen-doped, hydrogenated carbon (i-C:HN).

Yet another advantage of the present invention is an improved magnetic recording medium including a protective overcoat layer comprised of IBD i-C:HN.

Still another advantage of the present invention is an improved IBD method for forming i-C:HN films or layers suitable for use as protective overcoat materials in magnetic recording media applications.

A still further advantage of the present invention is an improved method for regulating or controlling the amount of N dopant atoms contained in IBD i-C:HN films or layers.

Additional advantages and other features of the present invention will be set forth in the description which follows and in part will become apparent to those having ordinary skill in the art upon examination of the following or may be learned from the practice of the present invention. The advantages of the present invention may be realized and obtained as particularly pointed out in the appended claims.

According to one aspect of the present invention, the foregoing and other advantages are obtained in part by providing a hard, abrasion-resistant material useful as a protective overcoat for a magnetic recording medium, which material comprises ion beam-deposited (IBD), nitrogen-doped, hydrogenated carbon (i-C:HN).

According to embodiments of the present invention, the mechanical and tribological properties of the IBD, i-C:HN material are substantially the same as IBD, undoped, hydrogenated carbon (i-C:H) but the electrical resistivity and optical band gap ($E_{BG}$) thereof are substantially lower; the hardness is about 15–20 GPa, the density is about 1.5–2.5 g/cm³, and the $E_{BG}$ is less than about 1.8 eV.

In further embodiments according to the present invention, the material comprises about 5–25 at. % each of H and N and the $E_{BG}$ is about 1.4–1.6 eV; and a magnetic recording medium comprises a protective overcoat layer of the IBD i-C:HN material having a thickness less than about 100 Å.

Another aspect of the present invention is a method of forming a layer of an abrasion-resistant coating material, which method comprises:

(a) supplying an ion beam generator with a hydrocarbon gas of formula $C_xH_y$, where x=1–4 and y=2–10, and nitrogen ($N_2$) gas to generate an ion beam comprising C, H, and N-containing ions; and (b) directing the ion beam onto the surface of a substrate to deposit a layer of IBD i-C:HN thereon.

In embodiments according to the present invention, the mechanical and tribological properties of the IBD i-C:HN layer are substantially the same as IBD, undoped i-C:H, but the electrical resistivity and $E_{BG}$ are substantially lower; the hardness of the layer of IBD i-C:HN is about 15–20 GPa, the density is about 1.5–2.5 g/cm³, the electrical resistivity is less than about $10^{11}$ ohm-cm, and the $E_{BG}$ is less than about 1.8 eV.

According to further embodiments of the present invention, the layer of IBD i-C:HN comprises about 5–25 at. % each of H and N and the $E_{BG}$ thereof is about 1.4–1.6 eV; step (a) comprises supplying the ion beam generator with acetylene ($C_2H_2$) and $N_2$ gases at a $C_2H_2:N_2$ flow ratio of from about 1:1 to about 20:1; step (b) comprises depositing a layer of the IBD i-C:HN less than about 100 Å thick on the substrate surface; and the substrate comprises a magnetic recording medium.

According to still further embodiments of the present invention, step (a) further comprises supplying an end-Hall-type ion beam generator with an inert gas and generating the ion beam under the following conditions:

| | |
|---|---|
| anode current: | 4–12 amperes |
| magnet current: | 2–8 amperes |
| anode voltage: | 60–100 volts |
| total gas flow: | 100–200 sccm |
| hydrocarbon gas flow: | 20–40 sccm |
| nitrogen gas flow: | 2–30 sccm |
| pressure: | 1.5–4.5 mTorr |

According to still another aspect of the present invention, a method of forming a layer of an abrasion-resistant protective coating material comprising IBD i-C:HN is provided, which method comprises the steps of:

(a) supplying a hydrocarbon gas of formula $C_xH_y$, where x=1–4 and y=2–10, and $N_2$ gas to an ion beam generator to generate an ion beam comprising C, H, and N-containing ions;

(b) providing a substrate having a surface for deposition of said layer of IBD i-C:HN thereon;

(c) directing the ion beam onto the surface of the substrate to deposit the layer of IBD i-C:HN thereon; and (d) controlling or regulating the content of N atoms in the IBD i-C:HN layer by controlling the hydrocarbon gas:$N_2$ gas flow ratio supplied to the ion beam generator.

In embodiments according to the present invention, step (a) comprises supplying acetylene ($C_2H_2$) gas to the ion beam generator as the hydrocarbon gas; and step (d) comprises controlling the $C_2H_2$:$N_2$ gas flow ratio to be within from about 1:1 to about 20:1; whereby step (c) comprises depositing a layer of IBD i-C:HN comprising about 5–25 at. % each of H and N; step (c) further comprises depositing a layer of IBD i-C:HN less than about 100 Å thick and having a hardness of about 15–20 GPa, density of about 1.5–2.5 g/cm$^3$, electrical resistivity less than about $10^{11}$ ohm-cm, and $E_{BG}$ of about 1.4–1.6 eV; and step (c) comprises providing a magnetic recording medium as the substrate.

According to further embodiments of the present invention, step (a) further comprises utilizing an end-Hall-type ion beam generator, supplying the ion beam generator with an inert gas, and generating the ion beam under the following operating conditions:

| | |
|---|---|
| anode current: | 4–12 amperes |
| magnet current: | 2–8 amperes |
| anode voltage: | 60–100 volts |
| total gas flow: | 100–200 sccm |
| hydrocarbon gas flow: | 20–40 sccm |
| nitrogen gas flow: | 2–30 sccm |
| pressure: | 1.5–4.5 mTorr |

Additional advantages of the present invention will become readily apparent to those skilled in the art from the following detailed description, wherein embodiments of the present invention are shown and described, simply by way of illustration of the best mode contemplated for practicing the present invention. As will be described, the present invention is capable of other and different embodiments, and its several details are susceptible of modification in various obvious respects, all without departing from the spirit of the present invention. Accordingly, the description is to be regarded as illustrative in nature, and not as limitative.

DESCRIPTION OF THE INVENTION

The present invention addresses and solves problems arising from the electrical insulating properties of hard, abrasion-resistant a-C:H films utilized as protective overcoat layers in magnetic recording media, e.g., hard disks. More specifically, the inventive methodology provides novel materials: (1) having the advantageous mechanical and tribological properties associated with a-C:H; (2) usable at the thinner thicknesses provided by ion beam deposition (IBD) techniques; and (3) having sufficiently reduced insulative properties vis-à-vis conventional sputtered a-C:H and IBD i-C:H materials as to eliminate, or at least minimize, deleterious electrical charge build-up during hard disk operation.

According to the present invention, the problems and difficulties attendant upon the use of a-C:H and IBD i-C:H materials as protective overcoat layers in the manufacture of magnetic recording media, such as hard disks, are eliminated, or at least minimized, by nitrogen (N) doping of IBD i-C:H in an amount sufficient to substantially reduce the electrical resistivity from that of undoped IBD i-C:H, while maintaining the advantageous mechanical and tribological properties thereof as well as the ability to employ films of reduced thickness. e.g., less than about 100 Å, such as are required for use with ultra high-density magnetic recording media.

The IBD method has been successfully employed to produce hydrogenated ion-beam carbon (IBD i-C:H) films that exhibit superior tribological performance as compared to conventional sputtered a-C:H films, at thicknesses below about 100 Å. However, inasmuch as these IBD i-C:H films are electrically insulative, they are subject to the same problem of charge build-up associated with the conventional sputtered a-C:H films.

The present invention is based upon the decrease in resistivity and optical band gap ($E_{BG}$) observed when sputtered a-C:H films are doped with nitrogen (N) atoms to form a-C:HN films (J. H. Kaufman et al., *Phys. Rev.* B39, 13053 (1989); O. Amir et al., *J. Appl. Phys.* 70, 4958 (1991)). The resistivity of undoped, IBD i-C:H was measured and compared with that of sputtered, N-doped, a-C:HN films. whereby it was determined that the sputtered, N-doped a-C:HN films were substantially less resistive than the IBD, undoped films. Therefore, in order to reduce the resistivity (and $E_{BG}$) of IBD i-C:H films in order to increase their usefulness as ultra-thin (i.e., less than about 100 Å thick) protective overcoat layers for magnetic recording media such as hard disks, N-doped, IBD i-C:HN films were produced by supplying a mixture of hydrocarbon ($C_xH_y$, where x=1–4 and y=2–10) gas and nitrogen ($N_2$) gas to the ion beam generator. The nitrogen atom (N) content of the produced films was readily controlled within from about 15 to about 25 at. % by varying the ratio of the flow rate of the hydrocarbon gas to that of the $N_2$ gas. Hydrogen atom (H) content of the obtained films was less dependent upon variation in hydrocarbon gas/$N_2$ gas flow ratio, and generally was within from about 2 to about 25 at. %. The N-doped IBD i-C:HN films advantageously retained the superior mechanical and tribological properties of undoped, IBD i-C:H films at ultra-thin thicknesses, i.e., hardness of from about 15 to about 20 GPa, density of about 1.5–2.5 g/cm$^3$, while exhibiting substantially reduced resistivity of less than about $10^{11}$ ohm-cm and $E_{BG}$ of less than about 1.8 eV, e.g., about 1.4–1.6 eV. Representative results of experiments conducted for determining the dependence of film properties on variation of the hydrocarbon gas/$N_2$ gas flow ratio are summarized in Table 1, wherein the hydrocarbon gas $C_xH_y$ is acetylene ($C_2H_2$).

TABLE 1

| | $C_xH_y$ only | $C_xH_y$:$N_2$ = 3:1 | $C_xH_y$:$N_2$ = 1:1 |
|---|---|---|---|
| H (at. %) | 20 | 16.5 | 15.5 |
| N (at. %) | 0 | 10.5 | 16 |
| $E_{BG}$ (eV) | 1.79 | 1.52 | 1.46 |

As is evident from Table 1, the N atom content of IBD i-C:HN films is readily regulated and/or controlled by appropriate selection of the $C_xH_y$:$N_2$ flow ratio, i.e., the N atom content can be increased by increasing the flow rate of $N_2$ gas supplied to the ion beam generator, relative to that of the hydrocarbon gas. In addition, the value of $E_{BG}$ is progressively decreased with increase in the flow rate of $N_2$ gas, and hence with increasing N atom content of the films.

Any of various ion beam sources can be employed to achieve the objectives of the present invention, including, inter alia, broad- and narrow-beam sources, Kaufman-type DC discharge sources, RF or microwave plasma discharge sources, electron-cyclotron resonance (ECR) sources, gridless sources such as the end-Hall source of U.S. Pat. No. 4,862,032, the disclosure of which is incorporated herein by reference, and hollow cathode ion sources. By way of illustration, but not limitation, IBD i-C:HN films and coatings containing from about 5 to about 25 at. % N atoms and having mechanical, tribological, electrical, and optical properties suitable for extended use as ultra-thin, i.e., less than about 100 Å thick, e.g., a thickness of about 20 to about 80 Å, protective overcoat layers on substrates comprising magnetic recording media were obtained by use of an end-Hall ion beam source (Diamonex, Inc., Allentown, Pa.) operated under the following conditions:

| | |
|---|---|
| anode current: | 4–12 amperes |
| magnet current: | 2–8 amperes |
| anode voltage: | 60–100 volts |
| total gas flow: | 100–200 sccm |
| hydrocarbon gas ($C_2H_2$) flow: | 10–30 sccm |
| pressure: | 1.5–4.5 mTorr |

The present invention provides a number of advantages over the conventional sputter-deposited a-C:H and a-C:HN materials for use as abrasion-resistant protective overcoat layers for magnetic recording media, such as hard disks. More specifically, the IBD i-C:HN films formed according to the inventive methodology are substantially less susceptible to deleterious charge-build up effects associated with the more resistive a-C:H materials and can be employed at ultra-thin thicknesses (i.e., less than about 100 Å) at which neither the a-C:H or the a-C:HN materials are usable, thereby meeting the requirement of very thin overcoat layers for high density magnetic recording media. In addition, the inventive methodology is fully compatible with all other aspects of magnetic recording media technology and is readily adapted for use in automated manufacturing processes.

In the previous description, numerous specific details are set forth, such as specific materials, structures, reactants, processes, etc., in order to provide a better understanding of the present invention. However, the present invention can be practiced without resorting to the details specifically set forth. In other instances, well known processing materials, structures, and techniques have not been described in detail in order not to unnecessarily obscure the present invention.

Only the preferred embodiments of the present invention and but a few examples of its versatility are shown and described in the present disclosure. It is to be understood that the present invention is capable of use in various other combinations and environments and is susceptible of changes and/or modifications within the scope of the inventive concept as expressed herein.

What is claimed is:

1. An abrasion-resistant material useful as a protective overcoat layer for a magnetic recording medium, which material comprises ion beam-deposited, nitrogen-doped, hydrogenated carbon (IBD i-C:HN), wherein the hardness of the IBD i-C:HN layer being about 15–20 GPa, the density being about 1.5–2.5 g/cm$^3$, the electrical resistivity being less than about $10^{11}$ ohm-cm, and the $E_{BG}$ being about 1.4–1.6 eV.

2. The material according to claim 1, comprising about 5–25 at. % each of H and N.

* * * * *